United States Patent
Tung

(10) Patent No.: US 6,789,439 B2
(45) Date of Patent: Sep. 14, 2004

(54) RECIPROCAL FORCE OUTPUTTING MECHANISM

(76) Inventor: Tien-Chen Tung, 4A23 No. 5, Sec. 5, Hsin Yi Rd., Taipei (TW)

( * ) Notice: Subject to any disclaimer, the term of this patent is extended or adjusted under 35 U.S.C. 154(b) by 138 days.

(21) Appl. No.: 10/164,003

(22) Filed: Jun. 7, 2002

(65) Prior Publication Data

US 2003/0226413 A1 Dec. 11, 2003

(51) Int. Cl.[7] .................... F16H 19/04; F16H 27/04; F16H 27/02
(52) U.S. Cl. .................... 74/32; 74/84 R; 74/112; 74/132
(58) Field of Search .................... 74/32, 84 R, 112, 74/130, 132, 435, 29

(56) References Cited

U.S. PATENT DOCUMENTS

| | | | | |
|---|---|---|---|---|
| 765,783 A | * | 7/1904 | Morton | 74/32 |
| 768,138 A | * | 8/1904 | Northup | 74/32 |
| 823,341 A | * | 6/1906 | Livingston | 74/32 |
| 1,362,901 A | * | 12/1920 | Simonton | 74/32 |
| 1,490,611 A | * | 4/1924 | Kellum | 74/32 |
| 1,601,188 A | * | 9/1926 | Nagel | 74/32 |
| 1,636,612 A | * | 7/1927 | Noah | 74/32 |
| 1,818,313 A | * | 8/1931 | Everts | 74/32 |
| 2,385,457 A | * | 9/1945 | Morgan | 74/132 |

* cited by examiner

Primary Examiner—David A. Bucci
Assistant Examiner—Colby Hansen
(74) Attorney, Agent, or Firm—Troxell Law Office PLLC

(57) ABSTRACT

A reciprocal force outputting mechanism having a body having a slide slot that contains a slide block, thereby providing for the linear, reciprocal movement of the slide block within the slide slot. The slide block has an elongated opening formed centrally and a row of teeth are disposed along each of the two facing sides the said elongated opening, with a stem extending from one end of the said slide block inserted through a guide hole of the body. A fan-shaped gear is secured onto a power output shaft that rotates it. When the fan-shaped gear revolves and its teeth are respectively enmeshed with a row of teeth, the slide block is brought into reciprocal motion, causing the reciprocal movement of the stem which serves as a means of outputting force.

4 Claims, 5 Drawing Sheets

RECIPROCAL FORCE OUTPUTTING MECHANISM

BACKGROUND OF THE INVENTION

1. Field of the Invention

The invention herein relates to a reciprocal force outputting mechanism capable of generating linear, reciprocal motion.

2. Description of Related Art

A conventional power outputting mechanism in a grease lubricator, such as that disclosed in Taiwan Patent No. 361,587 (Improved Structure Electric Powered Grease Gun), utilizes a motor that drives a gear assembly, wherein the power of the said gear assembly is outputted to a conjoined eccentric wheel, with the worm of the eccentric gear moving the stem of a slide block back and forth axially to provide the force that squeezes out the grease.

In the said conventional power outputting mechanism, the large lateral pressure resulting when the worm transports the slide block causes increased surface contact and mechanical wear between the worm and the slide block. Furthermore, if a larger excursion of the slide block is desired, the diameter of the eccentric wheel must be increased such that the overall physical size of the power outputting mechanism becomes bigger and heavier. As such, the invention herein was developed. to improve upon the drawbacks of the said conventional power outputting mechanism.

SUMMARY OF THE INVENTION

The primary objective of the invention herein to provide a reciprocal force outputting mechanism of relatively compact dimensions that is capable of longer travel and flexibility and, furthermore, has less lateral pressure between transmission components and thus minimal wear.

Other objectives, functions, and embodiments of the present invention are further elaborated by the brief description of the drawings and followed by the detailed description of the invention herein.

BRIEF DESCRIPTION OF THE DRAWINGS

The present invention can be more fully understood by reference to the following description and accompanying drawings, in which.

DETAILED DESCRIPTION OF THE INVENTION

Figure 1:
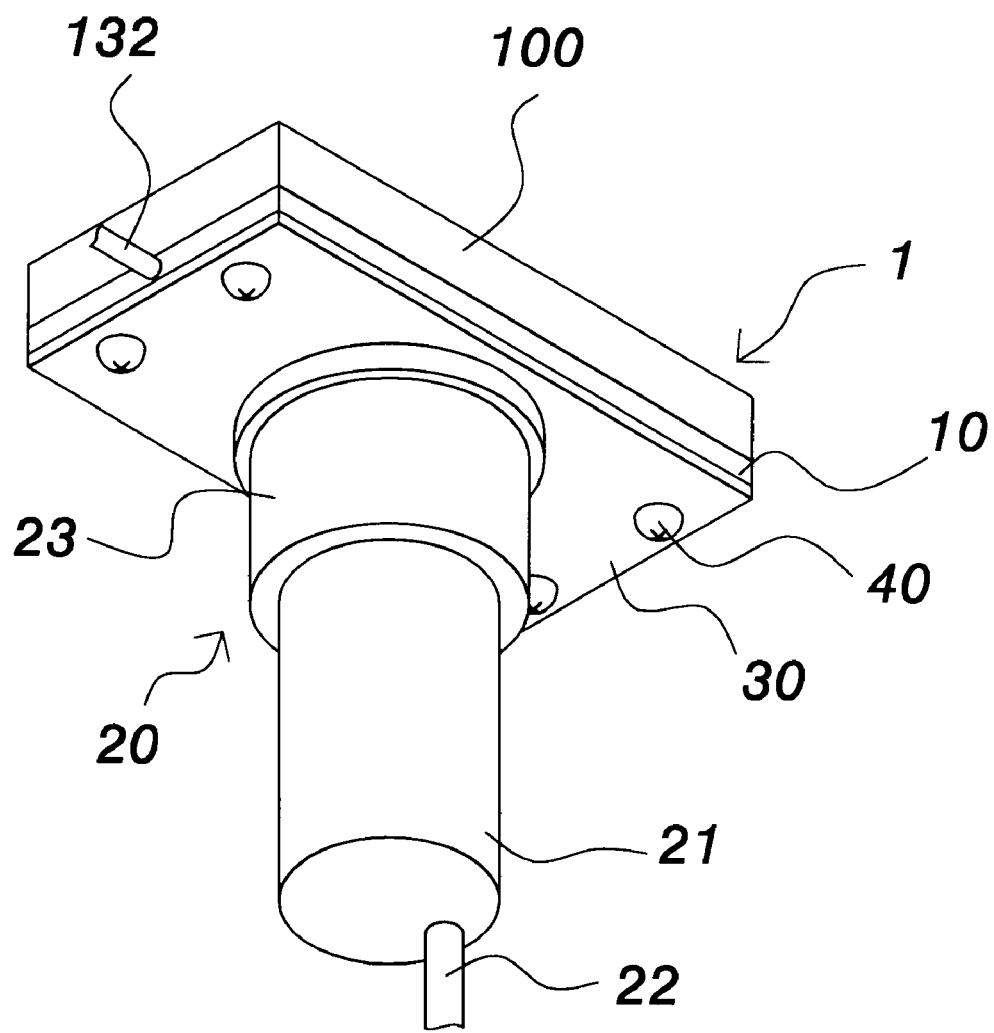
FIG. 1 is an isometric drawing of the invention herein.
Figure 2:
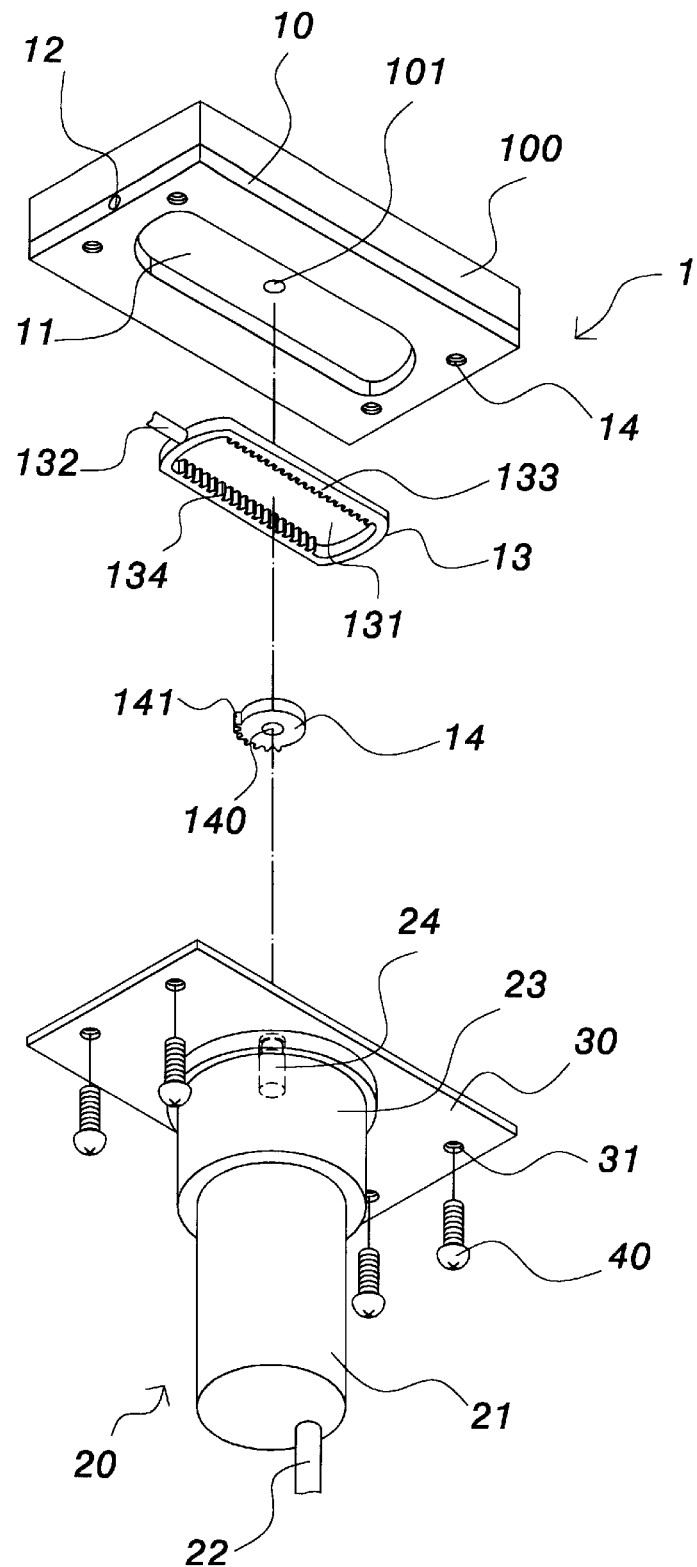
FIG. 2 is an exploded drawing of the invention herein.

Referring to FIG. 1 and FIG. 2, the invention herein is comprised of a body 1 conjoined to an actuating device 20; the said body 1 consists of a base 10 fastened to an upper cover 100, the said upper cover 100 affixed to a side of the base 10 utilizing screws; the said base 10 has a slide slot 11 and a guide hole 12 contiguous with the slide slot 11, the said slide slot 11 utilized to contain a slide block 13; the said slide block 13 has an elongated opening 131, with a stem 132 extending from one side that is inserted through the guide hole 12 and emerges from the outer side; a row of teeth 133 and 134 are disposed along each of the two facing sides of the said elongated opening 131; the said actuating device 20 is attached onto a lower cover 30, with the actuating device 20 consisting of a motor (or a pneumatic mechanism) 21 mounted on the lower cover 30; coupled to and rotating a gear train 23, the said motor (or a pneumatic mechanism) 21 is connected to batteries, an alternating current power supply, or a direct current power supply (or an air compressor) by means of wires (or conduit); the power output shaft 24 of the said gear train 23 is inserted through the center hole 140 of a fan-shaped gear 14 and rotatably situated in a journal hole 101 in the upper cover 100; the fan-shaped gear 14 is secured onto the said power output shaft 24, which enables the rotation of the fan-shaped gear 14; a plurality of threaded support posts 40 are inserted through a plurality of holes 31 in the lower cover 30 and fastened to a plurality of threaded holes 14 in the base 10, enabling the attachment of the actuating device 20 to the other side of the base 10 with the slide block 13 contained in the slide slot 11.

Figure 3:
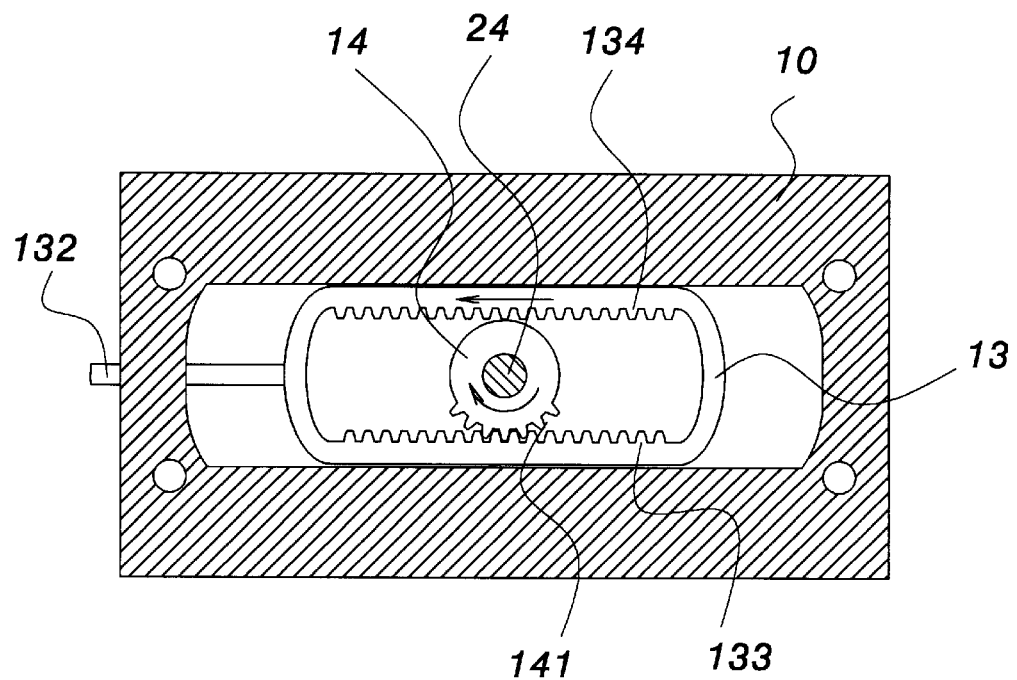
FIG. 3 is an orthographic drawing of the invention herein that illustrates its operation.
Figure 4:
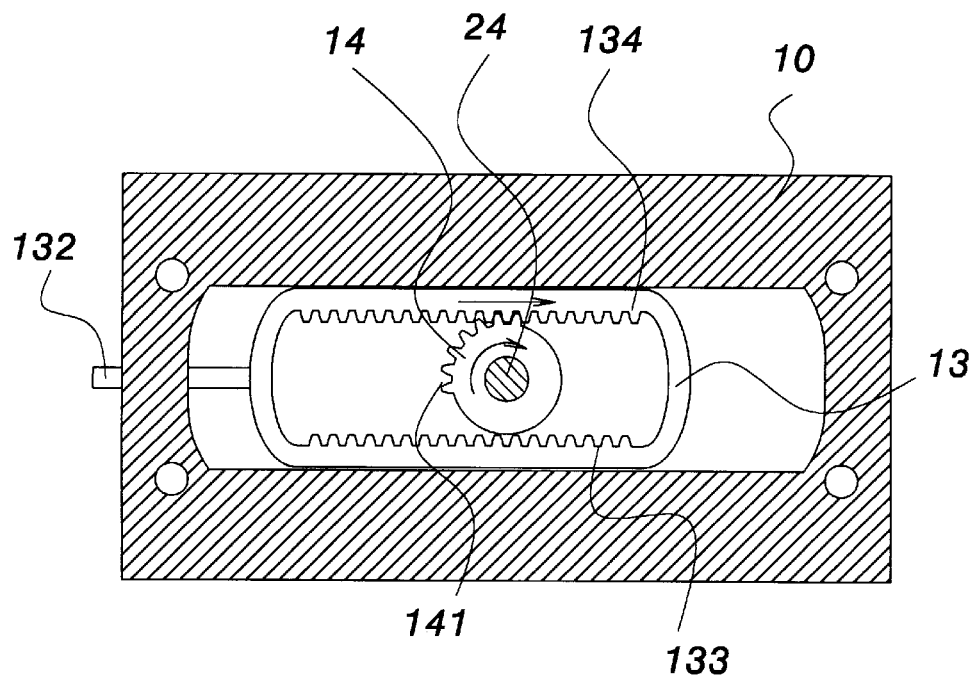
FIG. 4 is another orthographic drawing of the invention herein that illustrates its operation.

Referring to FIG. 3 and FIG. 4, the fan-shaped gear 14 revolves as the power output shaft 24 of the actuating device 20 rotates. Referring to FIG. 3, when the teeth 141 of the fan-shaped gear 14 are enmeshed with the row of teeth 133, the slide block 13 and the stem 132 move towards the left side of the drawing. When the teeth 141 are enmeshed with the row of teeth 134, the slide block 13 and the stem 132 move towards the right side of the drawing. As such, the rotation of the fan-shaped gear 14 causes the reciprocal, linear motion of the stem 132 at a usable level of power output. The distribution of the said fan-shaped gear 14 teeth 132 does not exceed a semicircular arrangement, thereby preventing simultaneous enmeshment with the two rows of teeth 133 and 134; furthermore, the top lands of the said rows of teeth 133 and 134 are pitched such that the teeth 141 smoothly engages each of the rows of teeth 133 and 134.

The fan-shaped gear 14 utilized in the invention herein respectively drives the rows of teeth 133 and 134 of the slide block 13 such that slide block 13 produces an alternating backward and forward movement, the reciprocal power output of which is conveyed by utilizing the stem 132. Since the relatively small diameter of the fan-shaped gear 14 of the invention herein enables the stem 132 to produce a larger reciprocal stroke, this reduces physical dimensions such that the overall power output mechanism is more flexible in terms of application. Furthermore, the denticulated rows of teeth 133 and 134 that transfer rotation involves a lesser degree of lateral pressure and, therefore, minimizes transmission component wear.

Figure 5:
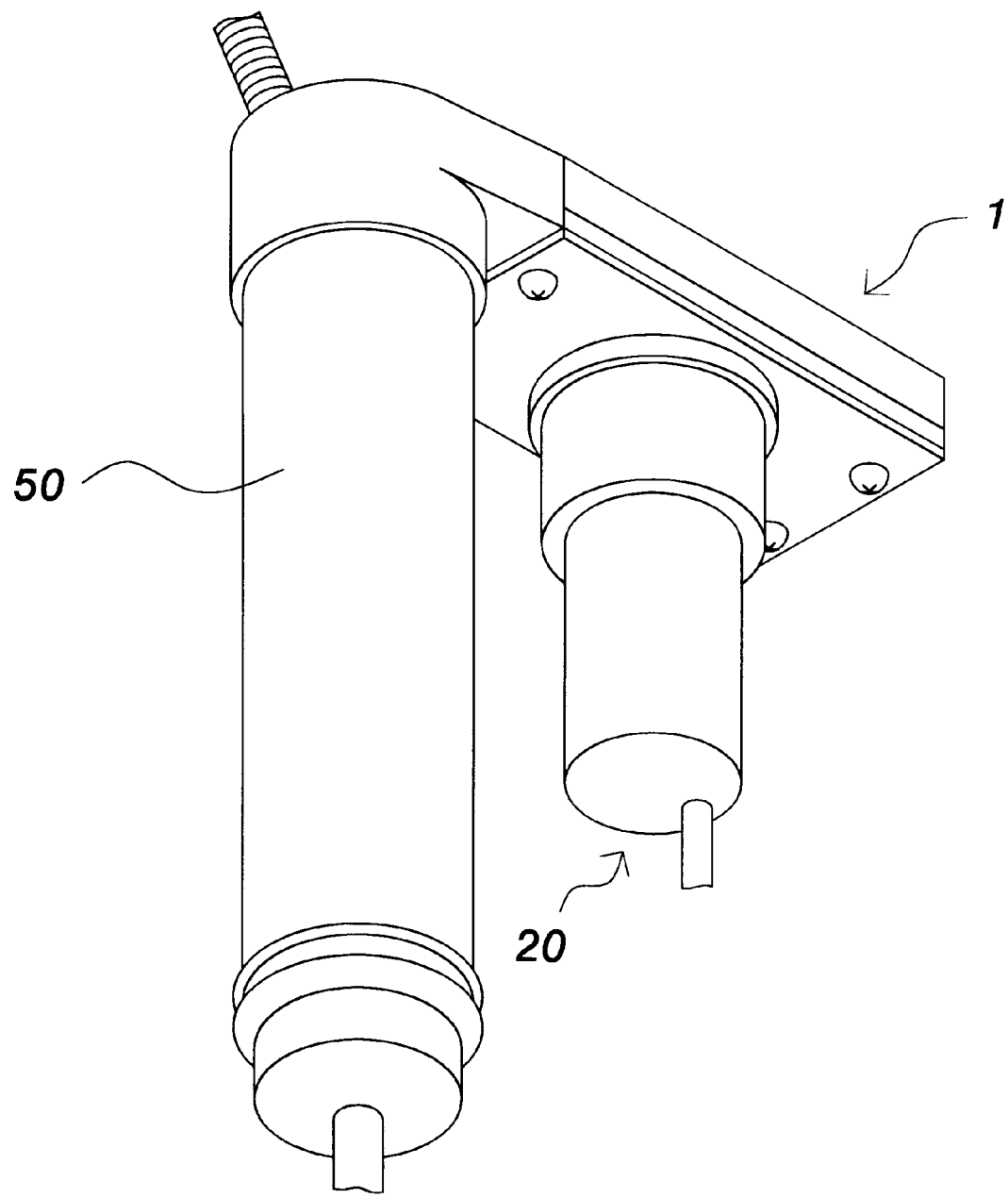
FIG. 5 is an isometric drawing of an embodiment of the invention herein.

Referring to FIG. 5, when the invention herein is utilized, one extremity of the body 1 is assembled to a grease dispensing device 50 such that the reciprocating action of stem 132 provides the force required for grease application.

Figure 6:
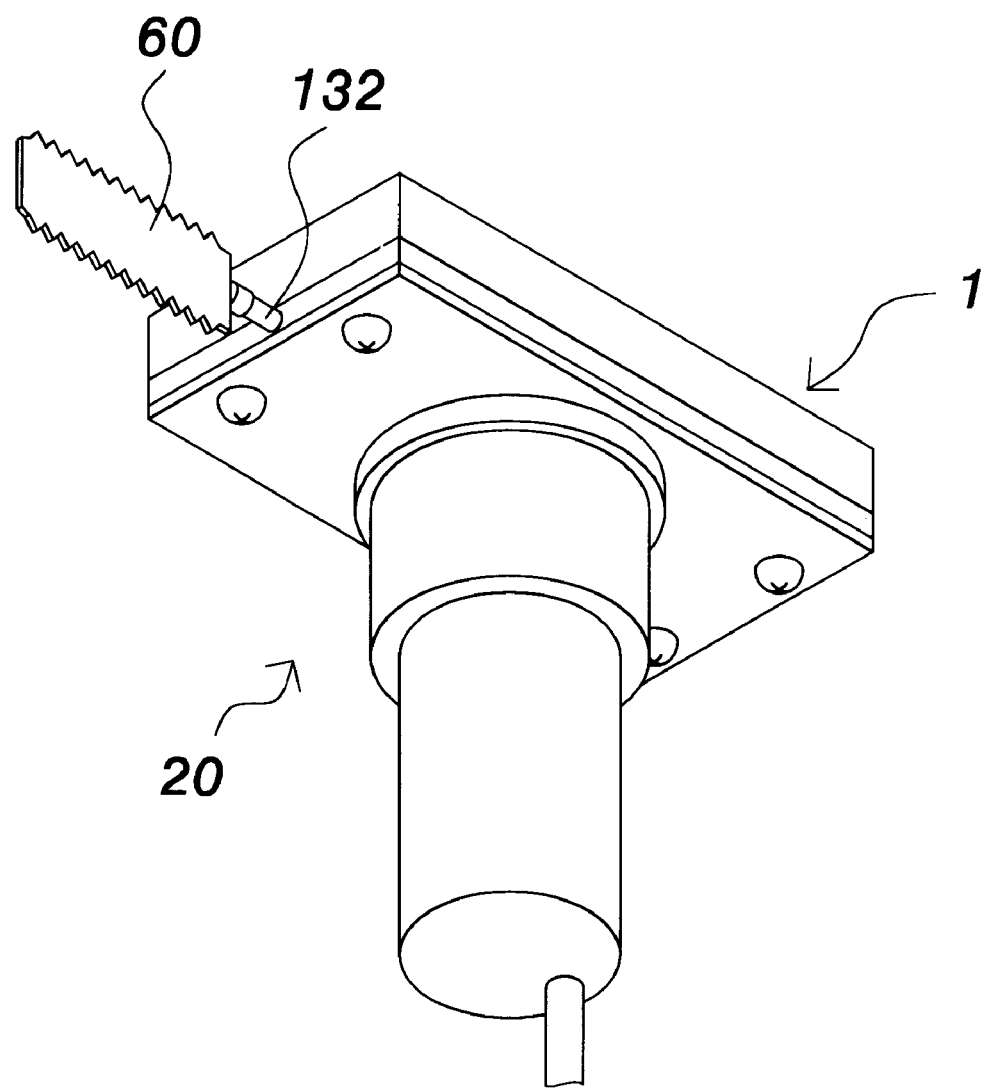
FIG. 6 is an isometric drawing of another embodiment of the invention herein.

Referring to FIG. 6, the stem 132 of the invention herein is assembled to a saw 60 such that the reciprocating action of the stem 132 enables the saw 60 to cut objects.

The preceding description only discloses embodiments utilizing the technological content of the invention herein and all embellishments and modifications based on it by persons skilled in the technology shall remain protected within the proposed patent claims of the present invention.

What is claimed is:

1. A reciprocal force outputting mechanism comprising:

a body conjoined to an actuating device; the body has a slide slot that contains a slide block, thereby providing for a reciprocal movement of the slide block along the interior edges of the slide slot; the slide block has an elongated opening formed centrally and a row of teeth are disposed along each of the two facing sides of the elongated opening; a stem extending from one end of the slide block is inserted through a guide hole of the body; a power output shaft of the actuating device is inserted through a center hole of a gear and rotatably situated in a journal hole in an upper cover; the gear is secured onto the power output shaft, which enables the rotation of the gear; when the gear revolves and teeth of the gear are respectively enmeshed with said row of teeth, the slide block is brought into reciprocal motion, causing the reciprocal movement of the stem which serves as a means of outputting force;

wherein the body consists of a base fastened to the upper cover; the base encloses the slide slot containing the slide block and the upper cover has a journal hole in which the power output shaft is rotatably situated; and wherein the actuating device consist of a motor mounted on a lower cover, with the motor coupled to and rotating a gear train; the power output shaft of the said gear train is inserted through the center hole of the gear; and a plurality of threaded support posts are inserted through a plurality of holes in the lower cover and fastened to a plurality of threaded holes in the base, enabling the attachment of the actuating device to the other side of the base.

2. The reciprocal force outputting mechanism of the invention herein, according to claim 1, wherein the distribution of the gear teeth does not exceed a semicircular arrangement.

3. A reciprocal force outputting mechanism comprising:

a body conjoined to an actuating device; the body has a slide slot that contains a slide block, thereby providing for a reciprocal movement of the slide block along the interior edges of the slide slot; the slide block has an elongated opening formed centrally and a row of teeth are disposed along each of the two facing sides of the elongated opening; a stem extending from one end of the slide block is inserted through a guide hole of the body; a power output shaft of the actuating device is inserted through a center hole of a gear and rotatably situated in a journal hole in an upper cover; the gear is secured onto the power output shaft, which enables the rotation of the gear; when the gear revolves and teeth of the gear are respectively enmeshed with said row of teeth, the slide block is brought into reciprocal motion, causing the reciprocal movement of the stem which serves as a means of outputting force;

wherein the body consists of a base fastened to the upper cover; the base encloses the slide slot containing the slide block and the upper cover has a journal hole in which the power output shaft is rotatably situated; and wherein the actuating device consists of a pneumatic mechanism mounted on a lower cover, with the said pneumatic mechanism coupled to and rotating a gear train; the power output shaft of the gear train is inserted through the center hole of the gear; and a plurality of threaded support posts are inserted through a plurality of holes in the lower cover and fastened to a plurality of threaded holes in the base, enabling the attachment of the actuating device to the other side of the base.

4. The reciprocal force outputting mechanism of claim 3, wherein the distribution of the gear teeth does not exceed a semicircular arrangement.

* * * * *